(12) United States Patent
Haruta et al.

(10) Patent No.: US 12,073,074 B2
(45) Date of Patent: Aug. 27, 2024

(54) INFORMATION PROCESSING DEVICE AND INFORMATION PROCESSING PROGRAM

(71) Applicant: FUJIFILM CORPORATION, Tokyo (JP)

(72) Inventors: Takafumi Haruta, Kanagawa (JP); Yuji Onozawa, Kanagawa (JP); Tatsuo Fukushima, Kanagawa (JP); Yohei Makino, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/252,716

(22) PCT Filed: Dec. 1, 2021

(86) PCT No.: PCT/JP2021/044141
§ 371 (c)(1),
(2) Date: May 11, 2023

(87) PCT Pub. No.: WO2022/118895
PCT Pub. Date: Jun. 9, 2022

(65) Prior Publication Data
US 2023/0418461 A1 Dec. 28, 2023

(30) Foreign Application Priority Data
Dec. 2, 2020 (JP) .................................. 2020-200483

(51) Int. Cl.
*G06F 3/0488* (2022.01)
*B41J 29/42* (2006.01)
(Continued)

(52) U.S. Cl.
CPC ........ *G06F 3/0488* (2013.01); *G06F 3/04845* (2013.01); *G06F 3/167* (2013.01)

(58) Field of Classification Search
USPC ....................................................... 345/173
See application file for complete search history.

(56) References Cited

U.S. PATENT DOCUMENTS

2009/0238347 A1 9/2009 Kai
2011/0157048 A1 6/2011 Nakatani
(Continued)

FOREIGN PATENT DOCUMENTS

JP     2009-230391 A     10/2009
JP     2011-134212 A     7/2011
(Continued)

*Primary Examiner* — Chineyere D Wills-Burns
(74) *Attorney, Agent, or Firm* — SOLARIS Intellectual Property Group, PLLC

(57) ABSTRACT

An information processing device includes a CPU that executes control such that an operation unit receiving a movement operation through dragging or sliding of a user and giving an instruction for a predetermined processing is displayed on a display, the operation unit is moved to follow the movement operation when the movement operation is executed on the operation unit by the user, and when the movement operation ends after the movement of the operation unit from one end portion to a side in front of the other end portion of a movement region of the operation unit by the movement operation, the operation unit is moved to the other end portion and a notification unit notifies with a sound indicating that the predetermined processing is executed after the movement of the operation unit to a position corresponding to the other end portion.

12 Claims, 43 Drawing Sheets

(51) Int. Cl.
    *B41J 29/46*     (2006.01)
    *G06F 3/041*     (2006.01)
    *G06F 3/04845*     (2022.01)
    *G06F 3/04883*     (2022.01)
    *G06F 3/04886*     (2022.01)
    *G06F 3/16*     (2006.01)

(56) References Cited

U.S. PATENT DOCUMENTS

| | | | | |
|---|---|---|---|---|
| 2015/0046863 | A1* | 2/2015 | Zhao | G06F 3/0488 |
| | | | | 715/771 |
| 2015/0138046 | A1* | 5/2015 | Moon | G09G 5/18 |
| | | | | 345/7 |
| 2015/0301737 | A1* | 10/2015 | Koyama | G06F 3/04883 |
| | | | | 715/810 |
| 2017/0068430 | A1* | 3/2017 | Brown | G06F 3/0488 |
| 2017/0357317 | A1* | 12/2017 | Chaudhri | G06F 3/0488 |
| 2019/0204821 | A1* | 7/2019 | Yoon | G05D 1/0223 |
| 2019/0339804 | A1* | 11/2019 | Gleeson | G06F 3/0488 |
| 2021/0397342 | A1* | 12/2021 | Luo | G06F 3/0488 |
| 2022/0179613 | A1* | 6/2022 | Shimizu | H04R 1/1041 |

FOREIGN PATENT DOCUMENTS

| | | |
|---|---|---|
| JP | 2015-215926 A | 12/2015 |
| JP | 2019-164819 A | 9/2019 |
| JP | 2020-052787 A | 4/2020 |
| JP | 2020-087384 A | 6/2020 |

* cited by examiner

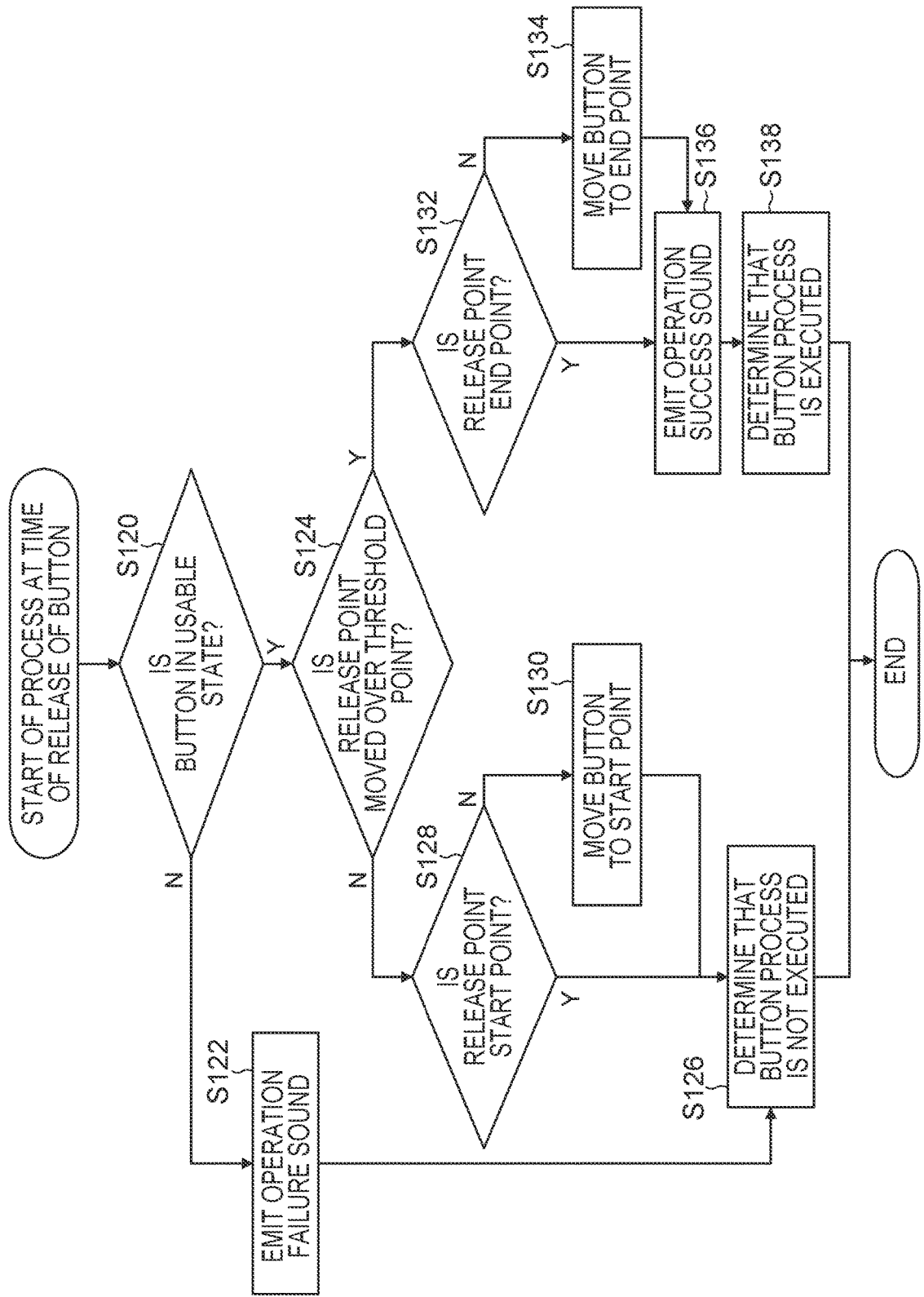

INFORMATION PROCESSING DEVICE AND INFORMATION PROCESSING PROGRAM

TECHNICAL FIELD

The present invention relates to an information processing device and an information processing program.

BACKGROUND ART

Japanese Patent Application Laid-Open (JP-A) No. 2020-52787 discloses an information processing device including a display control unit that displays a window on a touch panel and a detection unit that detects at least one of Touch-down, Touch-up, or Move as a touch operation on the touch panel. The display control unit executes control to hide the window when Touch-Up is detected without detecting Move after Touch-Down to the first area of the window is detected, and executes control such that at least one of display is executed by changing a size of the window and display by changing a display position of the window when Touch-Down to the first area of the window is detected and then Move is detected.

Japanese Patent Application Laid-Open (JP-A) No. 2011-134212 discloses an input device including a touch panel on which an input operation is executed by a user, a recording unit that records touch positions in time series during a period from Touch-down to Touch-up by the input operation on the touch panel, a calculation unit that calculates dispersion of touch positions based on each touch position recorded in the recording unit, and a determination unit that determines whether the input operation is an operation not including Move or an operation including Move based on the dispersion calculated by the calculation unit. The determination unit determines that the input operation does not include Move when the calculated dispersion is smaller than a threshold, and determines that the input operation includes Move when the calculated dispersion is not smaller than the threshold.

SUMMARY OF INVENTION

Technical Problem

There is a technology in which a user interface (UI) of a touch panel receives an operation of sliding a button by a user. In this technology, an erroneous operation by the user is inhibited.

However, in a case in which the button is released before an end point in the slide operation by the user, the slide operation is not completed. Therefore, the user cannot recognize whether or not the process corresponding to the button is executed.

An object of the present invention is to provide an information processing device and an information processing program making it easier for a user to recognize that a process is executed, compared with a case in which a sound is emitted at a time point at which a movement operation is ended after an operation unit is moved from one end portion of a movement region of the operation unit to a side in front of the other end portion of the movement region.

Solution to Problem

An information processing device according to a first aspect includes a processor. The processor executes control such that an operation unit, which is receiving a movement operation due to dragging or sliding by a user and which is for instructing a predetermined processing, is displayed on a display, the operation unit is moved so as to follow the movement operation when the movement operation is executed on the operation unit by the user, and when the movement operation ends after movement of the operation unit from one end portion to a side in front of another end portion of a movement region of the operation unit by the movement operation, the operation unit is moved to the other end portion and a notification unit provides notification with a sound indicating that the predetermined processing is to be executed after the movement of the operation unit to a position corresponding to the other end portion.

An information processing device according to a second aspect may be the information processing device according to the first aspect in which in a case in which the operation unit is moved from the one end portion over a predetermined threshold point by the movement operation, and then the movement operation ends in front of the other end portion, the processor causes the notification unit to provide notification with the sound indicating that the predetermined processing is to be executed after the movement of the operation unit to the other end portion and the movement of the operation unit to the position corresponding to the other end portion, and in a case in which the movement operation ends without moving over the threshold point from the one end portion by the movement operation, the processor moves the operation unit to the one end portion, and causes the notification unit to provide notification with a sound indicating that the predetermined processing is not to be executed after the movement of the operation unit to a position in front of the one end portion.

An information processing device according to a third aspect may be the information processing device according to the first aspect or the second aspect in which in a case in which an error occurs in the predetermined processing after execution of the predetermined processing has begun, the processor causes the notification unit to provide notification with a sound indicating that the error has occurred and moves the operation unit to the one end portion.

An information processing device according to a fourth aspect may be the information processing device according to the third aspect in which in a case in which the error occurs in the predetermined processing after the execution of the predetermined processing has begun, the processor causes the notification unit to provide notification with the sound indicating that the error has occurred and subsequently moves the operation unit to the one end portion.

An information processing device according to a fifth aspect may be the information processing device according to the third aspect in which in a case in which the error occurs while the notification unit is being caused to provide notification with the sound indicating that the predetermined processing is to be executed, the processor causes the notification unit to separately provide notification with the sound indicating that the predetermined processing is to be executed and the sound indicating that the error has occurred.

An information processing device according to a sixth aspect may be the information processing device according to the fifth aspect in which in a case in which the error occurs while the notification unit is being caused to provide notification with the sound indicating that the predetermined processing is to be executed, the processor causes the notification unit to provide notification with the sound indicating that the predetermined processing is to be executed and subsequently causes the notification unit to provide notification with the sound indicating that the error has occurred.

An information processing device according to a seventh aspect may be the information processing device according to the fifth aspect in which in a case in which the error occurs while the notification unit is being caused to provide notification with the sound indicating that the predetermined processing is to be executed, the processor causes the notification unit to stop the notification with the sound indicating that the predetermined processing is to be executed and subsequently causes the notification unit to provide notification with the sound indicating that the error has occurred.

An information processing device according to an eighth aspect may be the information processing device according to any one of the first to seventh aspects in which when the movement operation ends after the movement of the operation unit from the one end portion to the side in front of the other end portion by the movement operation, the processor moves the operation unit to the other end portion, and when an operation is executed on the operation unit by a user while the operation unit is moved to the other end portion, the processor performs control such that the movement of the operation unit is stopped and the notification with the sound indicating that the predetermined processing is to be executed is stopped.

An information processing device according to a ninth aspect may be the information processing device according to the second aspect in which when the operation unit is moved over the threshold point by the movement operation, the processor causes the notification unit to provide notification that the operation unit has moved over the threshold point.

An information processing device according to a tenth aspect may be the information processing device according to the ninth aspect in which in a case in which the operation unit is moved over the threshold point by the movement operation and then the operation unit is returned to the side in front of the threshold point by the movement operation by the user, the processor causes the notification unit to provide notification that the operation unit has been returned to the side in front of the threshold point.

An information processing device according to an eleventh aspect may be the information processing device according to any one of the first aspect to the tenth aspect in which in a case in which the movement operation is executed on the operation unit, the processor performs control such that the notification with the sound indicating that the predetermined processing is to be executed is stopped.

An information processing device according to a twelfth aspect may be the information processing device according to the eleventh aspect in which in a case in which the movement operation ends after the movement of the operation unit to the other end portion by the movement operation, the processor performs control such that the notification unit provides notification with the sound indicating that the predetermined processing is to be executed after the end of the movement operation.

According to a thirteenth aspect, an information processing program causes a computer to execute control such that an operation unit, which is receiving a movement operation due to dragging or sliding by a user and which is for instructing a predetermined processing, is displayed on a display, the operation unit is moved so as to follow the movement operation when the movement operation is executed on the operation unit by the user, and when the movement operation ends after movement of the operation unit from one end portion to a side in front of another end portion of a movement region of the operation unit by the movement operation, the operation unit is moved to the other end portion and a notification unit provides notification with a sound indicating that the predetermined processing is to be executed after the movement of the operation unit to a position corresponding to the other end portion.

Advantageous Effects of Invention

According to the first aspect, it is easier for the user to recognize that the process is executed than in the case in which the sound is emitted at a time point at which the movement operation ends after the operation unit is moved from the one end portion to the front side of the other end portion of the movement region of the operation unit.

According to the second aspect, the user can recognize that the process is not executed earlier than in a case in which the movement operation ends without being moved over the threshold point, and the sound is notified of after the movement of the operation unit from the front side of the threshold point of the operation unit to one end portion.

According to the third aspect, the user can recognize that an error has occurred in the predetermined process and the state has returned to the state before the process.

According to the fourth aspect, it is possible to recognize an error in the predetermined process earlier than in a case in which a sound indicating that the error has occurred is notified of after the movement of the operation unit to one end portion.

According to the fifth aspect, the user can more easily recognize whether the predetermined process has been executed or the error has occurred in the predetermined process than in the case in which the notification unit notifies without separating the sound indicating that the predetermined process is executed from the sound indicating that the error occurs.

According to the sixth aspect, the user can recognize that an error has occurred in predetermined process.

According to the seventh aspect, the user can more easily recognize that the error has occurred in the predetermined process than in the case in which the notification unit notifies with the sound indicating that the error has occurred without stopping the notification with the sound indicating that the predetermined process is executed.

According to the eighth aspect, when the user executes an erroneous operation, the user can recognize that the predetermined process is not executed.

According to the ninth aspect, the user can recognize that the operation unit is moved over the threshold point by the movement operation.

According to the tenth aspect, the user can recognize that the operation unit is returned to the front side of the threshold point by the movement operation.

According to the eleventh aspect, the user can recognize that the predetermined process is not executed while the operation unit is operated.

According to the twelfth aspect, even in a case in which the operation unit is moved to the other end portion, the user can recognize that the predetermined process is not executed while the operation unit is operated.

According to the thirteenth aspect, it is easier for the user to recognize that the process is executed than in a case in which the sound is output at a time point at which the movement operation ends after the movement of the operation unit from the one end portion of the movement region of the operation unit to a side in front of the other end portion.

BRIEF DESCRIPTION OF DRAWINGS

FIG. 16 is a flowchart illustrating an example of a flow of a specific process executed by the image forming device according to the embodiment.

DESCRIPTION OF EMBODIMENTS

Figure 1:
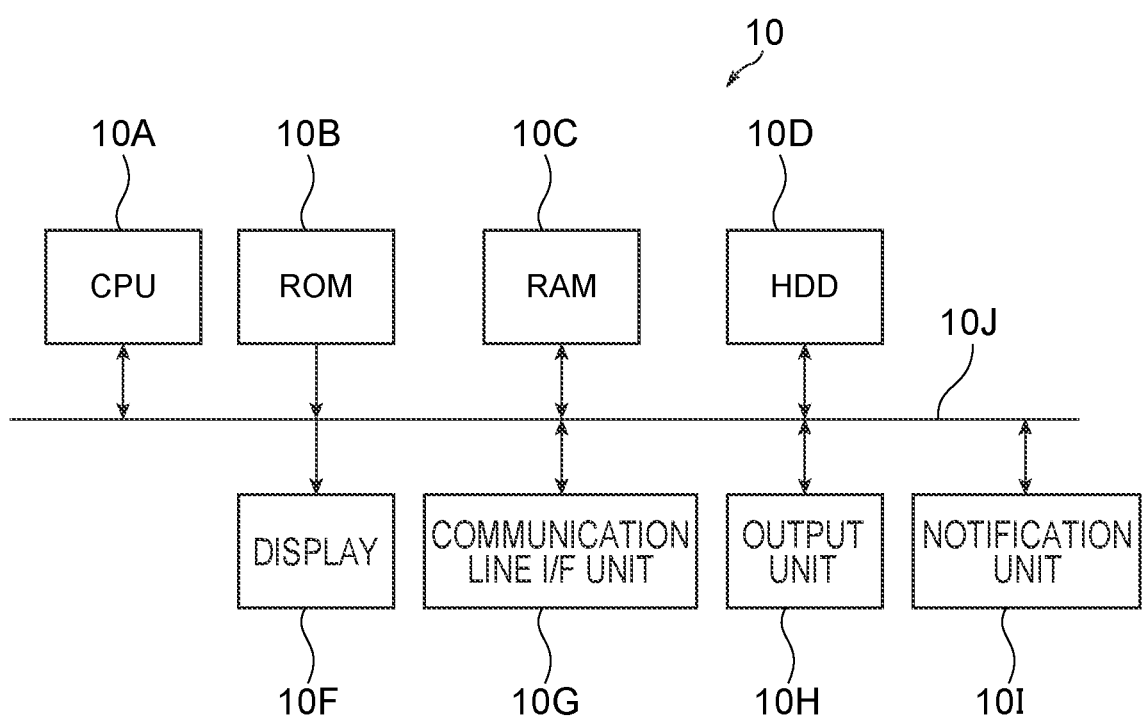
FIG. 1 is a block view illustrating a hardware configuration of an image forming device according to a present embodiment.

Hereinafter, an example of an embodiment of the present invention will be described in detail with reference to the drawings. In the drawings, the same or equivalent components and portions are denoted by the same reference numerals. Dimensional ratios in the drawings are exaggerated for facilitating description, and may be different from actual ratios. FIG. 1 is a block view illustrating a hardware configuration of an image forming device as an information processing device according to the present embodiment.

An image forming device 10 includes, as the predetermined process, for example, a process of printing a document file, an image file, or the like, a process of editing a file, a process of generating or processing information using equipment included in the image forming device 10, and a process of exchanging information between the image forming device 10 and another device. An output of a file is not limited to printing, and includes, for example, conversion of a file format.

The image forming device 10 is a device that forms an image on a recording medium such as a paper sheet based on a print job, and may be any device such as a printer or a multifunction peripheral.

The image forming device 10 according to the embodiment includes a central processing unit (CPU) 10A as an example of a processor, a read only memory (ROM) 10B, a random access memory (RAM) 10C, a hard disk drive (HDD) 10D, a display 10F, a communication line interface (I/F) unit 10G, an output unit 10H, and a notification unit 10I.

The CPU 10A controls an operation of the entire image forming device 10. The ROM 10B stores various control programs, various parameters, and the like in advance. The RAM 10C is used as a work area or the like when the CPU 10A executes various programs. The HDD 10D stores various types of data, application programs, and the like. A touch panel display is applied to the display 10F that is used to input various types of information and display various types of information.

The communication line I/F 10G is connected to a communication line (not illustrated), and transmits and receives various types of data to and from other devices connected to the communication line. The notification unit 10I includes a speaker.

Each unit of the above-described image forming device 10 is electrically connected to each other by a system bus 10J. In the image forming device 10 according to the embodiment, the HDD 10D is applied as a storage unit, but the invention is not limited thereto, and another nonvolatile storage unit such as a flash memory may be applied.

With the above configuration, in the image forming device 10 according to the embodiment, the CPU 10A accesses the ROM 10B, the RAM 10C, and the HDD 10D, acquires various types of data via the display 10F, and displays various types of information on the display 10F. In the image forming device 10, the CPU 10A controls transmission and reception of communication data via the communication line I/F 10G.

Figure 2:
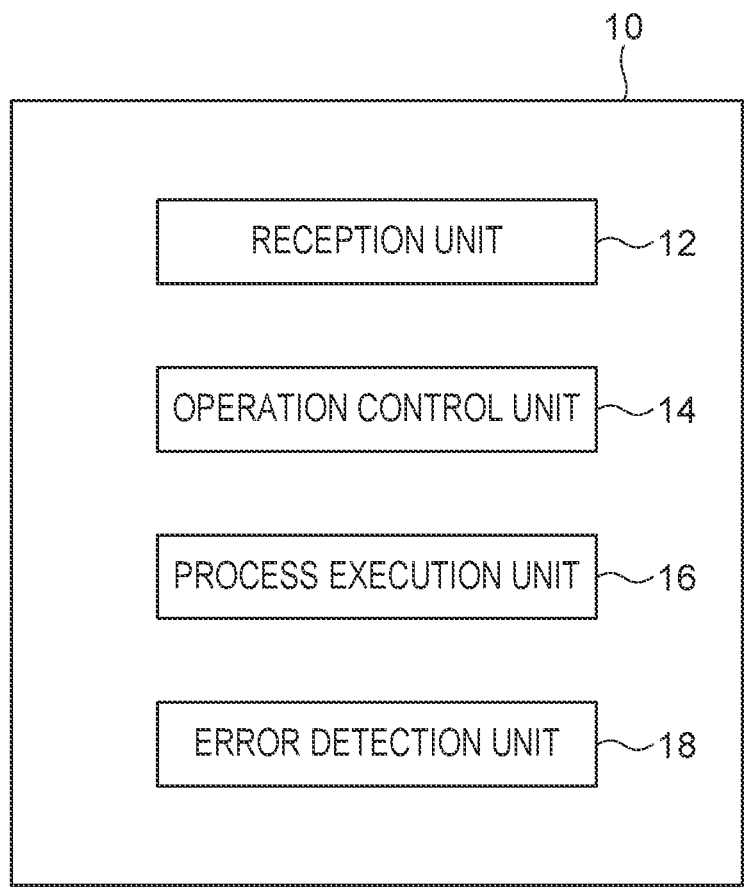
FIG. 2 is a functional block view illustrating the image forming device according to the embodiment.

In the image forming device 10 according to the embodiment, the CPU 10A executes a process of receiving an operation of giving an instruction for a predetermined process from the user and executing the predetermined process by executing a program stored in advance in the ROM 10B or the HDD 10D, Next, a functional configuration of the image forming device 10 according to the embodiment configured as described above will be described. FIG. 2 is a functional block diagram of the image forming device 10 according to the embodiment. Each functional unit is implemented by the CPU 10A executing a program stored in advance in the ROM 10B or the HDD 10D.

The image forming device 10 has functions of a reception unit 12, an operation control unit 14, a process execution unit 16, and an error detection unit 18.

Figure 3A:
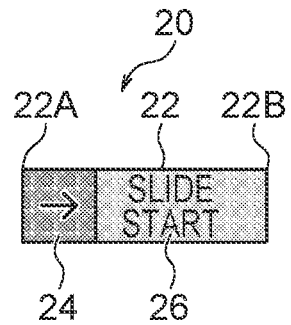
FIG. 3A is a view illustrating an operation example in a button movement operation in a user interface component.

The reception unit 12 displays an instruction screen for giving an instruction for the predetermined process on the display 10F. As illustrated in FIG. 3A, a user interface component 20 is disposed on the instruction screen. The user interface component 20 includes a pedestal 22 serving as a movement region, and a button 24 and a text display portion 26 that are disposed on the pedestal 22 and give instructions for the predetermined process. The button 24 is an example of an operation unit receiving a movement operation by dragging or sliding of the user and giving an instruction for the predetermined process.

As illustrated in FIGS. 3B to 3E, the button 24 can be moved from a start point 22A that is one end portion of the pedestal 22 to an end point 22B that is the other end portion, and the reception unit 12 receives a movement operation by sliding of the user. Specifically, the reception unit 12 receives a movement operation of sliding in the arrow direction while the button 24 is pressed by the user. While the button 24 is pressed, display indicates that the button 24 is pressed. For example, the color of the button 24 changes. When the movement operation on the button 24 is received, a portion through which the button 24 passes in the text display portion 26 enters non-display (see FIGS. 3C to 3E).

Figure 3B:
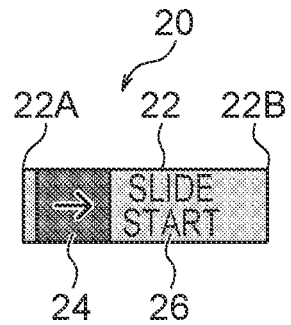
FIG. 3B is a view illustrating an operation example in a button movement operation in the user interface component.
Figure 3C:
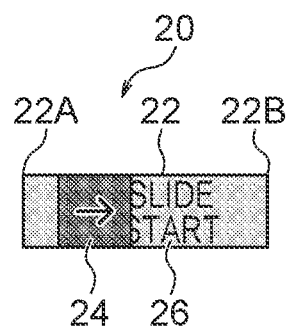
FIG. 3C is a view illustrating an operation example in a button movement operation in the user interface component.
Figure 3D:
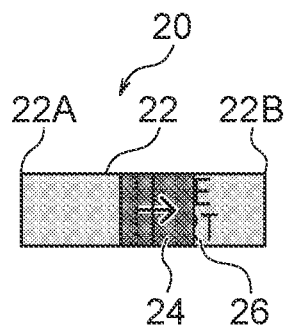
FIG. 3D is a view illustrating an operation example in a button movement operation in the user interface component.
Figure 3E:
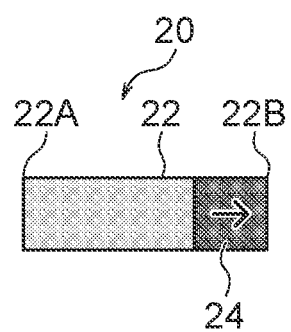
FIG. 3E is a view illustrating an operation example in a button movement operation in the user interface component.

FIG. 3B illustrates an example in which the color of the button 24 which is being pressed changes. FIG. 3D illustrates an example in which an x-coordinate position (a solid line) of the button 24 is moved over the threshold point (a broken line) in the X-axis direction which is the movement direction of the button 24. Here, the threshold point is a predetermined point for determining whether or not the execution of the predetermined process is enabled.

Figure 4A:
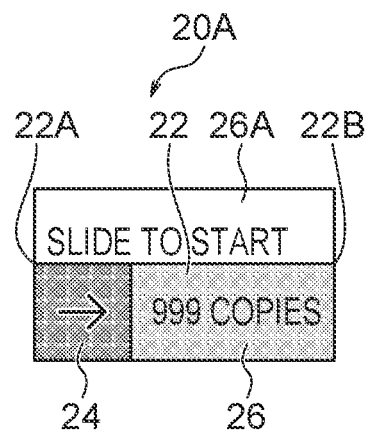
FIG. 4A is a view illustrating an operation example in a button movement operation in a user interface component.
Figure 4B:
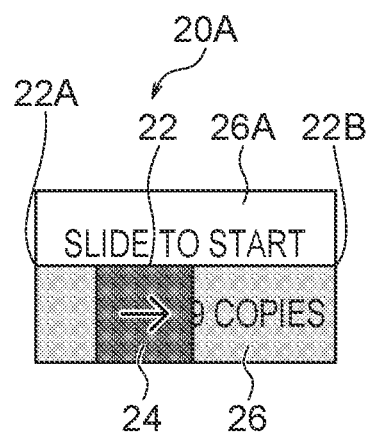
FIG. 4B is a view illustrating an operation example in a button movement operation in the user interface component.
Figure 4C:
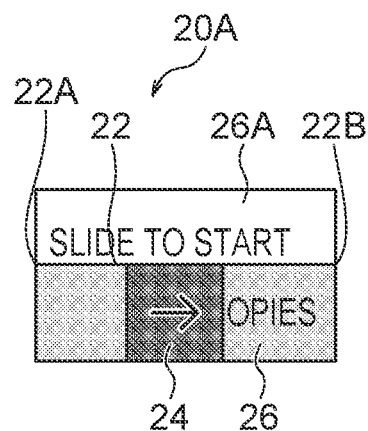
FIG. 4C is a view illustrating an operation example in a button movement operation in the user interface component.
Figure 4D:
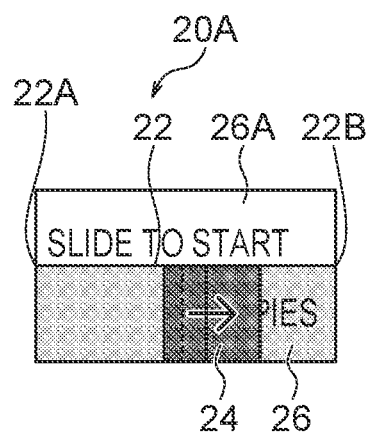
FIG. 4D is a view illustrating an operation example in a button movement operation in the user interface component.
Figure 4E:
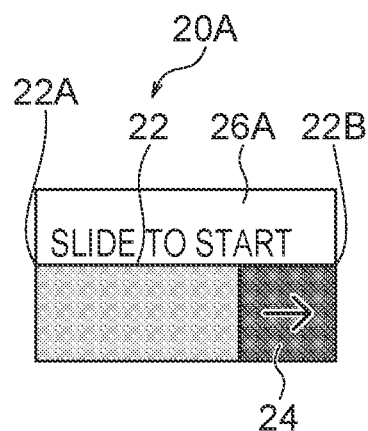
FIG. 4E is a view illustrating an operation example in a button movement operation in the user interface component.

A user interface component 20A as illustrated in FIG. 4A may be disposed on the instruction screen. In addition to the text display portion 26, the user interface component 20A further includes a text display portion 26A at a position different from the pedestal 22. As illustrated in FIGS. 4B to 4E, the button 24 can be moved from the start point 22A to the end point 22B of the pedestal 22, and a portion through which the button 24 passes in the text display portion 26 enters non-display, but the text display portion 26A does not enter non-display. In a portion through which the button 24 passes in the text display portion 26, content corresponding to the predetermined process is displayed. For example, in a case in which a copy or print process is executed, the number of copies is displayed. In a case in which facsimile transmission or mail transmission is executed, the number of transmission destinations is displayed. By displaying the content corresponding to the predetermined process in the portion through which the button 24 passes, the user can recognize the content during the movement operation by sliding.

In addition, a configuration of the user interface component is not limited to the configuration of FIGS. 3 and 4, and other configurations may be used as long as a movable button is provided.

Figure 5:
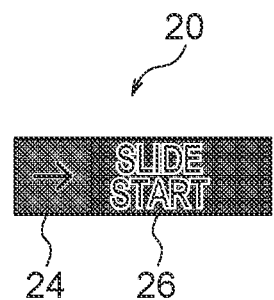
FIG. 5 is a view illustrating a display example of a button in an unusable state in the user interface component.

In a case in which the execution of the predetermined process corresponding to the button 24 is prohibited, as illustrated in FIG. 5, the colors of the button 24 and the text display portion 26 are changed to a color indicating an unusable state. The display of the button 24 is not changed even if the button 24 is pressed. In the case in which the color indicates the unusable state, it is sufficient if the unusable state can be visually recognized, and the invention is not limited to the case in which the color changes. For example, "unusable" display may be executed in the text display portion 26.

When the user executes a movement operation on the button 24, the operation control unit 14 moves the button 24 to follow the movement operation. Specifically, the button 24 is moved in the X-axis direction in accordance with the X-coordinate of the position at which a user's finger comes into contact with the display 10F.

Figure 6A:
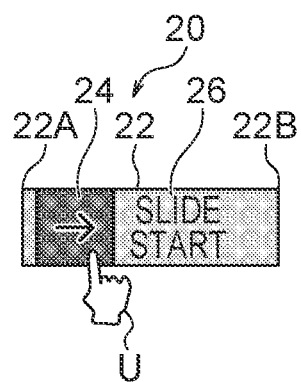
FIG. 6A is a view illustrating an operation example in a button movement operation in the user interface component.
Figure 6B:
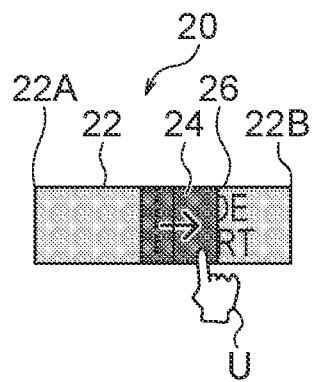
FIG. 6B is a view illustrating an operation example in a button movement operation in the user interface component.
Figure 6C:
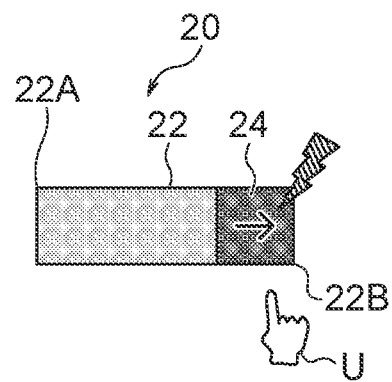
FIG. 6C is a view illustrating an operation example in a button movement operation in the user interface component.

When the button 24 is moved from the start point 22A to the end point 22B of the pedestal 22 by the movement operation and is released and the movement operation ends, the operation control unit 14 performs control such that the notification unit 10I notifies an operation success sound indicating that the predetermined process corresponding to the button 24 is executed, and the process execution unit 16 executes the predetermined process corresponding to the button 24 (see FIGS. 6A to 6C). Here, the releasing means that a finger of a user U moves away from the display 10F. In a case in which an operation is executed with a stylus pen or the like instead of the user's finger, releasing means that the stylus pen moves away from the display 10F.

FIG. 6B illustrates an example in which the x-coordinate position (a solid line) of the button 24 is moved over the threshold point (a broken line) by the movement operation of the button 24. FIG. 6C illustrates an example in which the notification unit 10I notifies of the operation success sound when the button 24 is moved to the end point 22B and then is released.

Figure 20:
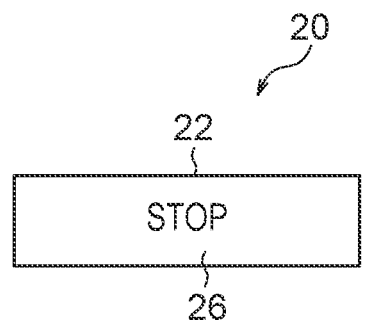
FIG. 20 is a view illustrating another configuration example of the user interface component.

While the predetermined process corresponding to the button 24 is executed, as illustrated in FIG. 20, the user interface component 20 may be switched to a configuration indicating that the predetermined process is stopped. For example, the button 24 enters non-display, and text "stop" is displayed on the text display portion 26. Here, when the user presses the pedestal 22, the process is stopped even while the predetermined process is executed. For example, in a case in which the copy process is executed, the copy process is stopped even if the copy of the number of copies input by the user in advance is not completed. The colors of the pedestal 22 and the text display portion 26 may be changed to colors indicating that the predetermined process is stopped. After the predetermined process is stopped, the display of the user interface component 20 may be returned to the display as illustrated in FIG. 3A. Alternatively, text of restart may be displayed on the text display portion 26 so that the stopped predetermined process can be restarted. The process may be restarted when the user presses the pedestal 22.

Figure 7A:
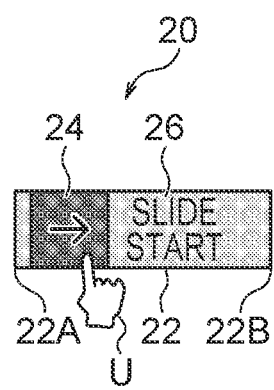
FIG. 7A is a view illustrating an operation example in a button movement operation in the user interface component.
Figure 7B:
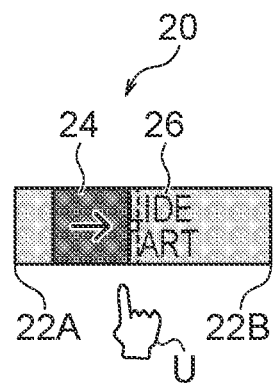
FIG. 7B is a view illustrating an operation example in a button movement operation in the user interface component.
Figure 7C:
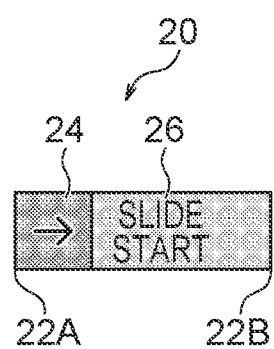
FIG. 7C is a view illustrating an operation example in a button movement operation in the user interface component.

When the operation control unit 14 moves the button 24 from the start point 22A of the pedestal 22 to a side in front of a predetermined threshold point by the movement operation, releases the button, and ends the movement operation, the operation control unit 14 moves the button 24 to the start point 22A without notifying of the operation success sound and executing the predetermined process corresponding to the button 24 (see FIGS. 7A to 7C). At this time, after the button 24 is moved to the front side of the start point 22A, the notification unit 10I may notify of an operation failure sound indicating that the predetermined process is not executed.

FIG. 7B illustrates an example in which the button 24 is released before the button 24 is moved over the threshold point (a broken line) by the movement operation of the button 24. FIG. 7C illustrates an example in which the button 24 is moved to the start point 22A.

Figure 8A:
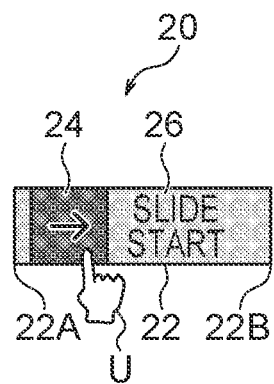
FIG. 8A is a view illustrating an operation example in a button movement operation in the user interface component.
Figure 8B:
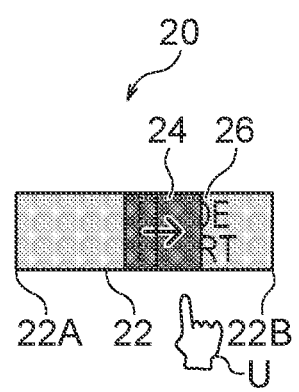
FIG. 8B is a view illustrating an operation example in a button movement operation in the user interface component.
Figure 8C:
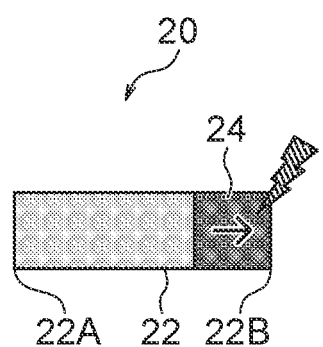
FIG. 8C is a view illustrating an operation example in a button movement operation in the user interface component.

In a case in which the operation control unit 14 moves the button 24 from the start point 22A of the pedestal 22 to move over the threshold point by the movement operation, releases the button 24 in front of the end point 22B, and ends the movement operation, the operation control unit 14 performs control such that the button 24 is moved to the end point 22B and the notification unit 10I notifies of the operation success sound after the movement of the movement of the button 24 to the end point 22B, and the process execution unit 16 executes the predetermined process corresponding to the button 24 (see FIGS. 8A to 8C).

FIG. 8B illustrates an example in which the button 24 is moved over the threshold point (broken line) by the movement operation of the button 24 and then is released. FIG. 8C illustrates an example in which the notification unit 10I notifies of the operation success sound after movement of the button 24 to the end point 22B.

Figure 9A:
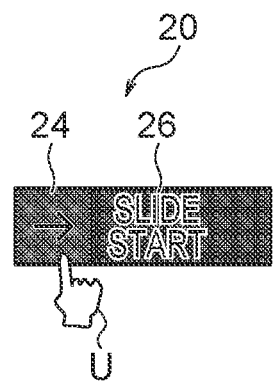
FIG. 9A is a view illustrating an operation example when a button in an unusable state is pressed in the user interface component.
Figure 9B:
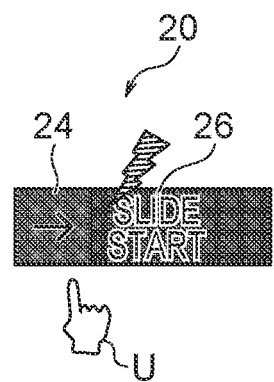
FIG. 9B is a view illustrating an operation example when the button in the unusable state is pressed in the user interface component.

When the button 24 is pressed and released in a case in which the execution of the predetermined process corresponding to the button 24 is prohibited, the operation control unit 14 causes the notification unit 10I to notify of an operation failure sound indicating that the predetermined process is not executed (see FIGS. 9A and 9B). FIG. 9A illustrates an example in which the button 24 in the unusable state is pressed. FIG. 9B illustrates an example in which the notification unit 10I notifies of the operation failure sound when the button 24 is released.

Figure 10:
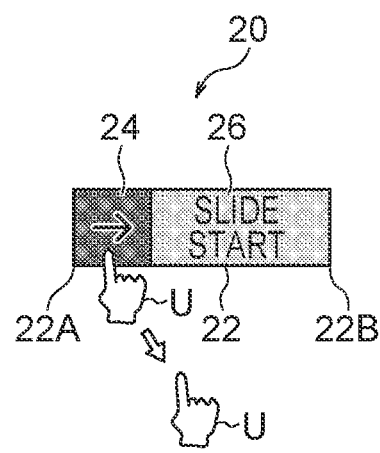
FIG. 10 is a view illustrating an operation example when the button is pressed and then released in the user interface component.

As illustrated in FIG. 10, when the button is pressed and is released without executing the movement operation, the operation control unit 14 does not execute the predetermined process corresponding to the button 24 (see FIG. 10). At this time, it is clear to the user that the predetermined process is not executed, and it is bothersome for the user to be notified of the operation failure sound indicating that the predetermined process is not executed. Therefore, it is preferable that the notification unit 10I does not notify with the operation failure sound.

Figure 11:
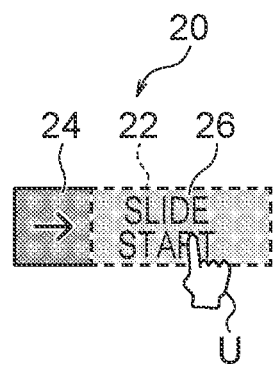
FIG. 11 is a view illustrating an operation example when a text display portion in the user interface component is operated.

Even when the text display portion 26 is pressed or the movement operation on the text display portion 26 is received, as illustrated in FIG. 11, the operation control unit 14 does not execute the predetermined process corresponding to the button 24 (see FIG. 11).

Figure 12A:
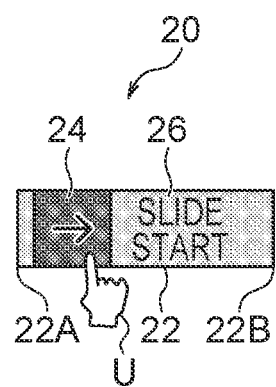
FIG. 12A is a view illustrating an operation example of the user interface component when it is detected that an error has occurred.
Figure 12B:
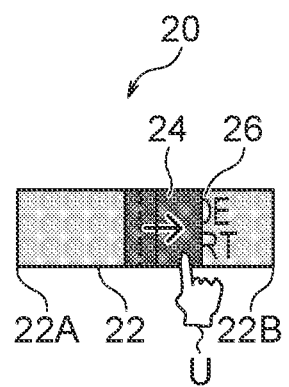
FIG. 12B is a view illustrating an operation example of the user interface component when it is detected that an error has occurred.
Figure 12C:
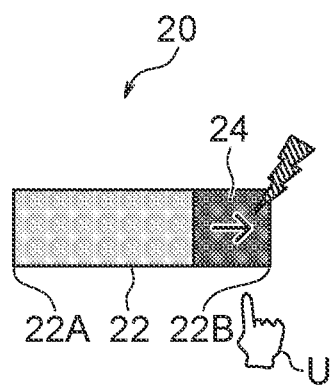
FIG. 12C is a view illustrating an operation example of the user interface component when it is detected that an error has occurred.
Figure 12D:
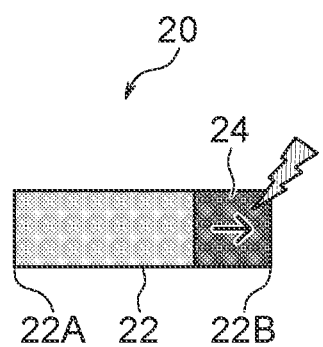
FIG. 12D is a view illustrating an operation example of the user interface component when it is detected that an error has occurred.
Figure 13:
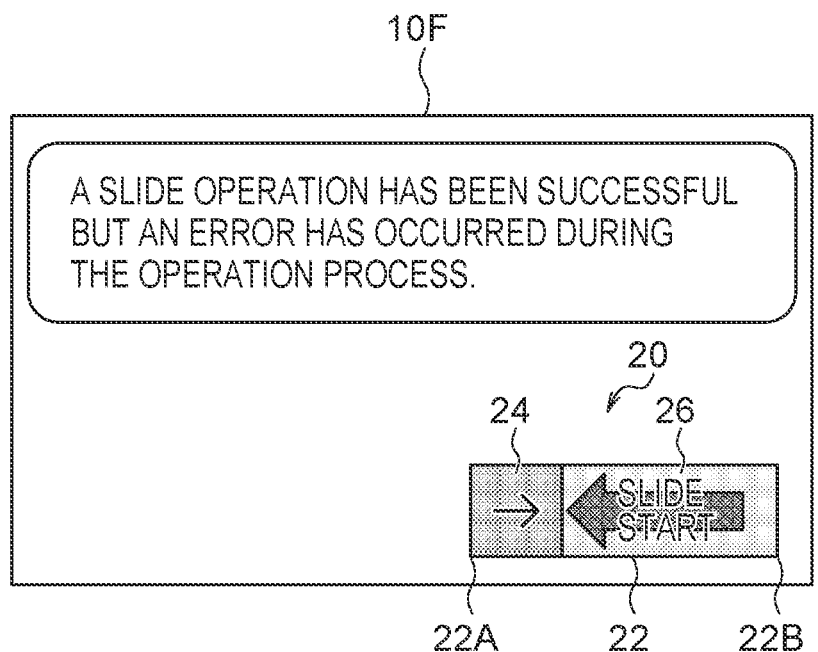
FIG. 13 is a view illustrating an example of an instruction screen when it is detected that an error has occurred.

In a case in which the error detection unit 18 detects that an error has occurred in the predetermined process after start of the execution of the predetermined process, the operation control unit 14 causes the notification unit 10I to notify of an error sound indicating that an error has occurred (see FIGS. 12A to 12D), and moves the button 24 to the start point 22A, as illustrated in FIG. 13. At this time, a message indicating that an error has occurred may be displayed.

FIG. 12B illustrates an example in which the button 24 is moved over the threshold point (a broken line) by the movement operation of the button 24. FIG. 12C illustrates an example in which after the button 24 is released, the button 24 is moved to the end point 22B, and then the notification unit 10I notifies of the operation success sound. FIG. 12D illustrates an example in which the notification unit 10I notifies of the error sound. FIG. 13 illustrates an example in which the button 24 is moved to the start point 22A and a message "A slide operation has been successful but an error has occurred during the operation process." is displayed.

At this time, in a case in which the error detection unit 18 detects that the error has occurred in the predetermined process after start of the execution of the predetermined process, the operation control unit 14 may move the button 24 to the start point 22A after the notification unit 10I notifies of the error sound.

The operation success sound, the operation failure sound, and the error sound may be any sound as long as the user can recognize a difference in sound. For example, it is sufficient to change a wavelength, a volume, or a ringing time of each sound.

Figure 14A:
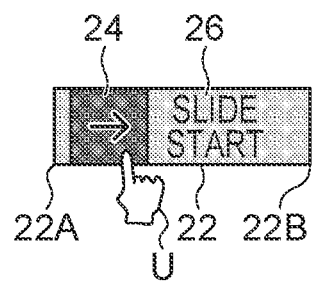
FIG. 14A is a view illustrating an operation example of the user interface component when it is detected that an error has occurred.
Figure 14B:
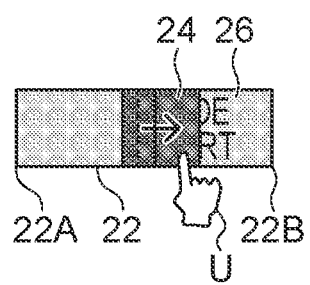
FIG. 14B is a view illustrating an operation example of the user interface component when it is detected that an error has occurred.
Figure 14C:
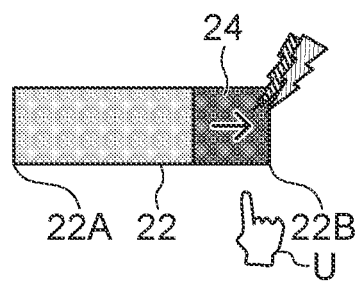
FIG. 14C is a view illustrating an operation example of the user interface component when it is detected that an error has occurred.

When the error detection unit 18 detects that an error has occurred in the predetermined process while the notification unit 10I notifies of the operation success sound, the operation control unit 14 causes the notification unit 10I to notify the operation success sound and the error sound separately (see FIGS. 14A to 14C). For example, when the error detection unit 18 detects that the error has occurred in the predetermined process while the notification unit 10I notifies of the operation success sound, the operation control unit 14 causes the notification unit 10I to notify the error sound after completion of the notification of the operation success sound. Alternatively, when the error detection unit 18 detects that the error has occurred in the predetermined process while the notification unit 10I notifies of the operation success sound, the operation control unit 14 stops the notification of the operation success sound and then causes the notification unit 10I to notify of the error sound. The operation success sound and the error sound may be notified in an overlapping manner. By executing the control as described above, it is easy for the user to recognize that the error has occurred as a result obtained by executing the predetermined process.

FIG. 14B illustrates an example in which the button 24 is moved over the threshold point (a broken line) by the movement operation of the button 24. FIG. 14C illustrates an example in which after the button 24 is released, the button 24 is moved to the end point 22B, and then the notification unit 10I notifies of the operation success sound and the error sound separately.

The process execution unit 16 executes the predetermined process corresponding to the button 24 in response to the movement operation of the button 24.

The error detection unit 18 detects that an error has occurred in the predetermined process executed by the process execution unit 16. For example, the error detection unit 18 detects an out-of-paper error in a process of printing a document file, an image file, or the like, and detects an unset error of a destination of another device in a process of exchanging information between the image forming device 10 and the other device.

Figure 15:
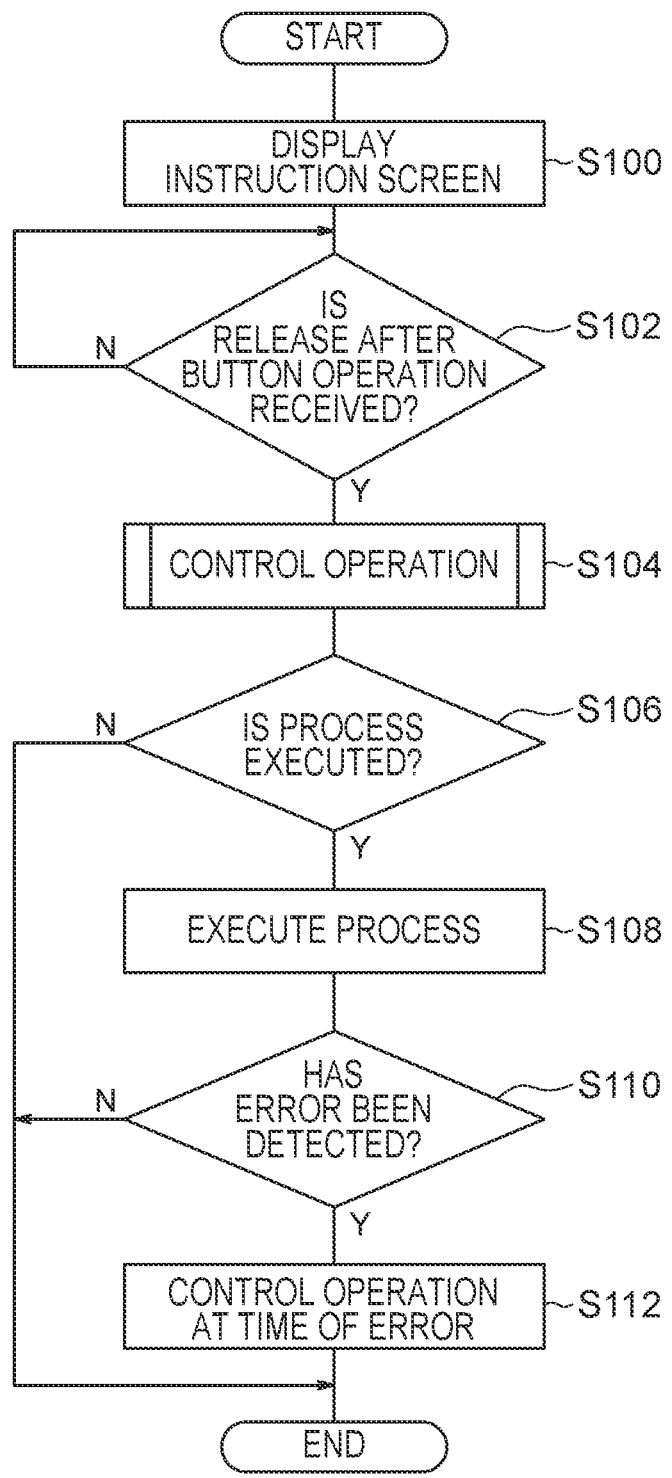
FIG. 15 is a flowchart illustrating an example of a flow of a specific process executed in the image forming device according to the embodiment.

Next, a process executed by the image forming device 10 according to the embodiment configured as described above will be described. FIG. 15 is a flowchart illustrating an example of a flow of a specific process executed by the image forming device 10 according to the embodiment. The process of FIG. 15 starts when the image forming device 10 is powered on.

In step S100, the reception unit 12 displays an instruction screen for giving an instruction for the predetermined process on the display 10F.

In step S102, the reception unit 12 determines whether or not the release after operation of the button 24 on the user interface component 20 on the instruction screen has been received. When the release after the operation of the button 24 in the user interface component 20 is received, the process proceeds to step S104.

In step S104, the operation control unit 14 controls the operation of the user interface component 20. Specifically, the control is implemented in the process of FIG. 16. FIG. 16 is a flowchart illustrating an example of a flow of a specific process executed in the image forming device 10 when release after the operation of the button 24 is received.

In step S120, the operation control unit 14 determines whether or not the button 24 is in the usable state. When the predetermined process corresponding to the button 24 is prohibited, it is determined that the button 24 is not in the usable state, and the process proceeds to step S122. Conversely, when the predetermined process corresponding to the button 24 is not prohibited, it is determined that the button 24 is in the usable state, and the process proceeds to step S124.

In step S122, the operation control unit 14 controls the notification unit 10I such that the operation failure sound is emitted. In step S126, the operation control unit 14 determines that the predetermined process corresponding to the button 24 is not executed.

In step S124, the operation control unit 14 determines whether or not the release point which is a position of the button 24 at the time of release is moved over the threshold point. When the release point is the front side of the threshold point, the process proceeds to step S128. Conversely, when the release point is moved over the threshold point, the process proceeds to step S132.

In step S128, it is determined whether or not the release point is the start point 22A. When the release point is the start point 22A, the process proceeds to step S126. Conversely, when the release point is not the start point 22A, the process proceeds to step S130.

In step S130, the operation control unit 14 moves the button 24 to the start point 22A, and the process proceeds to step S126.

In step S132, the operation control unit 14 determines whether or not the release point is the end point 22B. When the release point is the end point 22B, the process proceeds to step S136. Conversely, when the release point is not the end point 22B, the process proceeds to step S134.

In step S134, the operation control unit 14 moves the button 24 to the end point 22B, and the process proceeds to step S136.

In step S136, the operation control unit 14 controls the notification unit 10I such that the operation success sound is emitted. Then, in step S138, the operation control unit 14 determines that the predetermined process corresponding to the button 24 is executed.

In step S106 of FIG. 15, the operation control unit 14 determines whether or not it is determined in step S104 that the predetermined process corresponding to the button 24 is executed. In a case in which it is determined that the predetermined process corresponding to the button 24 is not executed, the process ends. Conversely, when it is determined that the predetermined process corresponding to the button 24 is executed, the process proceeds to step S108.

In step S108, the process execution unit 16 executes the predetermined process in accordance with the movement operation of the button 24.

In step S110, the operation control unit 14 determines whether or not the error detection unit 18 detects that an error has occurred in the predetermined process executed by the process execution unit 16. In a case in which the error detection unit 18 does not detect that the error has occurred, the process ends. Conversely, when the error detection unit 18 detects that the error has occurred, the process proceeds to step S112.

In step S112, in a case in which the error detection unit 18 detects that the error has occurred in the predetermined process after start of the execution of the predetermined process, the operation control unit 14 executes the following process. That is, the operation control unit 14 causes the notification unit 10I to notify of an error sound indicating that the error has occurred, moves the button 24 to the start point 22A, and ends the process.

As described above, when the button 24 is released beyond the threshold point by the movement operation, it is easy for the user to recognize that the predetermined process corresponding to the button 24 is executed by notifying of the operation success sound after moving the button 24 to the end point 22B.

In the above embodiment, the case in which the movement operation of sliding the button of the user interface component is received has been described as an example, but the invention is not limited thereto. A drag operation on the button of the user interface component may be received as a movement operation.

Figure 17A:
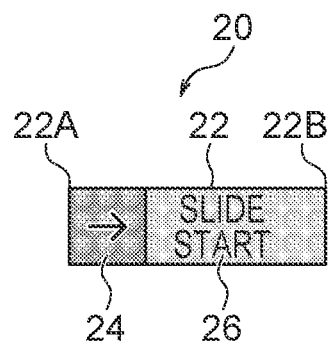
FIG. 17A is a view illustrating an operation example when a button is pressed in the user interface component.
Figure 17B:
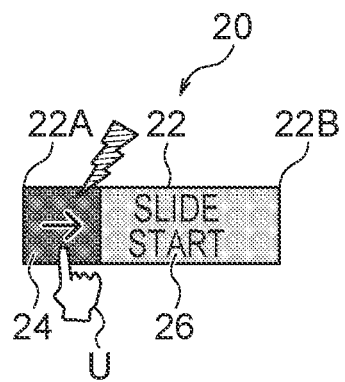
FIG. 17B is a view illustrating an operation example when the button is pressed in the user interface component.

Each point of the button movement operation may be notified of the point. Even for a user who is not good at a movement operation of sliding a button or is visually impaired, it is possible to assist the movement operation of the button by giving a notification for each point of the movement operation. For example, as illustrated in FIGS. 17A and 17B, a pressing sound may be notified when the button 24 is pressed.

Figure 18A:
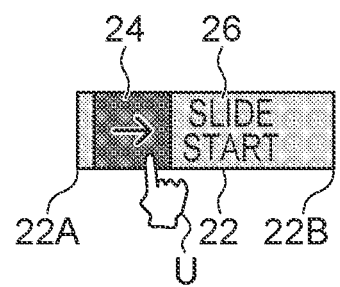
FIG. 18A is a view illustrating an operation example in a button movement operation in the user interface component.
Figure 18B:
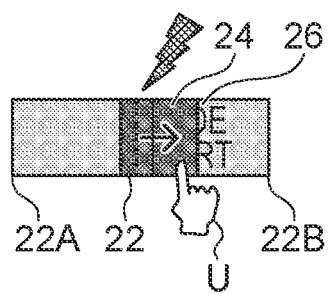
FIG. 18B is a view illustrating an operation example in a button movement operation in the user interface component.

In addition, as illustrated in FIGS. 18A and 18B, in a case in which the button 24 is moved over from the front side to the other side of the threshold point by the movement operation of the button 24, a threshold arrival sound may be notified at a time point at which the button 24 is moved over the threshold point. Instead of notifying of the threshold arrival sound, the color of the button 24 may be changed or a message may be displayed.

Figure 19A:
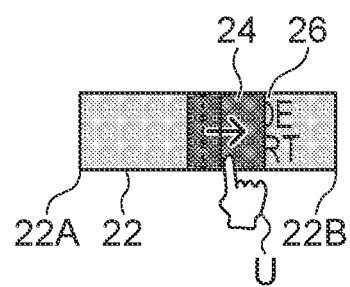
FIG. 19A is a view illustrating an operation example in a button movement operation in the user interface component.
Figure 19B:
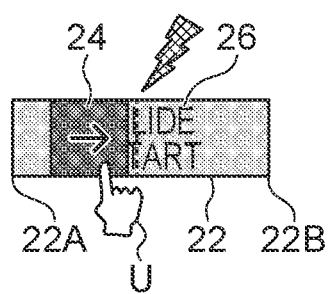
FIG. 19B is a view illustrating an operation example in a button movement operation in the user interface component.

As illustrated in FIGS. 19A and 19B, in a case in which the button 24 is moved over from the other side to the front side of the threshold point by the movement operation of the button 24, a threshold non-arrival sound may be notified of at a time point at which the button is moved over the threshold point. In addition, instead of notifying of the threshold non-arrival sound, the color of the button 24 may be changed or a message may be displayed.

Whether to notify of each of the above-described operation success sound, operation failure sound, error sound, threshold arrival sound, and threshold non-arrival sound may be switched by setting of the user, or may be automatically switched. In the case of the automatic switching, for example, in a case in which an erroneous operation of the button 24 exceeds a given number of times, each of the operation success sound, the operation failure sound, the error sound, the threshold arrival sound, and the threshold non-arrival sound related to the button 24 may be notified of. In association with the setting related to the predetermined operation, each of the operation success sound, the operation failure sound, the error sound, the threshold arrival sound, and the threshold non-arrival sound related to the button 24 may be notified of. For example, in a case in which a setting for preventing erroneous transmission of a facsimile is executed, each of the operation success sound, the operation failure sound, the error sound, the threshold arrival sound, and the threshold non-arrival sound related to the button 24 for instructing facsimile transmission may be notified of. An operation success sound, an operation failure sound, an error sound, a threshold arrival sound, and a threshold non-arrival sound may be notified of with regard to the button 24 for giving an instruction for the predetermined process with high predetermined security. A way to emit the sound may be switched by a setting of the user.

The case in which the operation success sound is notified of after the movement of the button 24 to the end point 22B has been described as an example, but the invention is not limited thereto. The operation success sound may be notified of at a timing at which the button 24 is moved to the front side of the end point 22B. The operation success sound at the end point 22B and the operation success sound in front of the end point 22B may be different sounds. The timing at which the operation success sound is notified in front of the end point 22B may be set as a release timing in accordance with a user setting.

In a case in which the button 24 is moved over the threshold point by the movement operation and then is released in front of the end point 22B, the operation control unit 14 may execute the following process when the user executes the touch operation or the movement operation of the button 24 while the button 24 is moved to the end point 22B. That is, the operation control unit 14 may execute control such that the movement of the button 24 is stopped and the notification of the operation success sound is stopped. A target of a touch operation executed to stop the movement of the button 24 while the button 24 is moved to the end point 22B is not limited to the button 24. For example, the pedestal 22 may be included, or the text display portion 26 may be included. Alternatively, the entire screen displayed on the display 10F may be adopted. By targeting a wider area than only the button 24, the user can stop the movement of the button 24 more reliably.

The operation control unit 14 may execute control such that the notification of the operation success sound is stopped even when the button 24 is moved to the end point 22B while the movement operation is executed on the button 24.

The case in which the movement operation in the X-axis direction is executed on the button 24 has been described as an example, but the invention is not limited thereto. A movement operation in a slope direction sloped in the X-axis direction may be executed on the button 24. Even in this case, the button 24 may be moved in the X-axis direction in accordance with the X-coordinate of the position where the user's finger comes into contact with the display 10F.

The case in which the invention is applied to the image forming device has been described as an example, but the invention is not limited thereto. The invention may be applied to an information processing device such as a smartphone or a computer. For example, the invention may be applied to an operation in an application of a smartphone or a computer.

In the above embodiment, the CPU 10A has been described as an example of a processor, but the processor is a processor in a broad sense, and includes a general-purpose processor (for example, a central processing unit (CPU) or the like) or a dedicated processor (for example, a graphics processing unit (GPU), an application specific integrated circuit (ASIC), a field programmable gate array (FPGA), a programmable logic device, and the like).

The operation of the processor in each of the above embodiments may be executed not only by one processor but also by a plurality of processors which are located at physically separated positions in cooperation. The order of each operation of the processor is not limited to the order described in each of the above embodiments, and may be appropriately changed.

The process executed by the image forming device 10 according to the above embodiment may be a process executed by software, a process executed by hardware, or a process in combining of software and hardware. The process executed by the image forming device 10 may be stored as a program in a storage medium for distribution.

The invention is not limited to the above, and it is needless to say that various modifications can be made in addition to the above without departing from the gist of the invention.

The disclosure of Japanese Patent Application No. 2020-200483 filed on Dec. 2, 2020 is incorporated herein by reference in its entirety. All documents, patent applications, and technical standards described in the present specification are incorporated herein by reference to the same extent as if each document, patent application, and technical standard were specifically and individually described to be incorporated by reference.

The invention claimed is:

1. An information processing device, comprising a processor, wherein the processor is configured to execute control such that:
 an operation unit, which is receiving a movement operation due to dragging or sliding by a user and which is for instructing a predetermined processing, is displayed on a display,
 the operation unit is moved so as to follow the movement operation when the movement operation is executed on the operation unit by the user, and when the movement operation ends after movement of the operation unit from one end portion to a side in front of another end portion of a movement region of the operation unit by the movement operation, the operation unit is moved to the other end portion and a notification unit provides notification with a sound indicating that the predetermined processing is to be executed after the movement of the operation unit to a position corresponding to the other end portion, wherein in a case in which the operation unit is moved from the one end portion over a predetermined threshold point by the movement operation, and then the movement operation ends in front of the other end portion, the processor causes the notification unit to provide notification with the sound indicating that the predetermined processing is to be executed after the movement of the operation unit to the other end portion and the movement of the operation unit to the position corresponding to the other end portion, and in a case in which the movement operation ends without moving over the threshold point from the one end portion by the movement operation, the processor moves the operation unit to the one end portion, and causes the notification unit to provide notification with a sound indicating that the predetermined processing is not to be executed after the movement of the operation unit to a position in front of the one end portion.

2. The information processing device according to claim 1, wherein, in a case in which an error occurs in the predetermined processing after execution of the predetermined processing has begun, the processor causes the notification unit to provide notification with a sound indicating that the error has occurred and moves the operation unit to the one end portion.

3. The information processing device according to claim 2, wherein, in a case in which the error occurs in the predetermined processing after the execution of the predetermined processing has begun, the processor causes the notification unit to provide notification with the sound indicating that the error has occurred and subsequently moves the operation unit to the one end portion.

4. The information processing device according to claim 2, wherein, in a case in which the error occurs while the notification unit is being caused to provide notification with the sound indicating that the predetermined processing is to be executed, the processor causes the notification unit to separately provide notification with the sound indicating that the predetermined processing is to be executed and the sound indicating that the error has occurred.

5. The information processing device according to claim 4, wherein, in a case in which the error occurs while the notification unit is being caused to provide notification with the sound indicating that the predetermined processing is to be executed, the processor causes the notification unit to provide notification with the sound indicating that the predetermined processing is to be executed and subsequently causes the notification unit to provide notification with the sound indicating that the error has occurred.

6. The information processing device according to claim 4, wherein, in a case in which the error occurs while the notification unit is being caused to provide notification with the sound indicating that the predetermined processing is to be executed, the processor causes the notification unit to stop the notification with the sound indicating that the predetermined processing is to be executed and subsequently causes the notification unit to provide notification with the sound indicating that the error has occurred.

7. The information processing device according to claim 1, wherein, when the movement operation ends after the movement of the operation unit from the one end portion to the side in front of the other end portion by the movement operation, the processor moves the operation unit to the other end portion, and when an operation is executed on the operation unit by a user while the operation unit is moved to the other end portion, the processor performs control such that the movement of the operation unit is stopped and the notification with the sound indicating that the predetermined processing is to be executed is stopped.

8. The information processing device according to claim 1, wherein, when the operation unit is moved over the threshold point by the movement operation, the processor causes the notification unit to provide notification that the operation unit has moved over the threshold point.

9. The information processing device according to claim 8, wherein, in a case in which the operation unit is moved over the threshold point by the movement operation and then the operation unit is returned to the side in front of the threshold point by the movement operation by the user, the processor causes the notification unit to provide notification that the operation unit has been returned to the side in front of the threshold point.

10. The information processing device according to claim 1, wherein, in a case in which the movement operation is executed on the operation unit, the processor performs control such that the notification with the sound indicating that the predetermined processing is to be executed is stopped.

11. The information processing device according to claim 10, wherein, in a case in which the movement operation ends after the movement of the operation unit to the other end portion by the movement operation, the processor performs control such that the notification unit provides notification with the sound indicating that the predetermined processing is to be executed after the end of the movement operation.

12. A non-transitory computer-readable storage medium storing a program executable by a computer to execute control such that:

an operation unit, which is receiving a movement operation due to dragging or sliding by a user and which is for instructing a predetermined processing, is displayed on a display, the operation unit is moved so as to follow the movement operation when the movement operation is executed on the operation unit by the user, and when the movement operation ends after movement of the operation unit from one end portion to a side in front of another end portion of a movement region of the operation unit by the movement operation, the operation unit is moved to the other end portion and a notification unit provides notification with a sound indicating that the predetermined processing is to be executed after the movement of the operation unit to a position corresponding to the other end portion, wherein in a case in which the operation unit is moved from the one end portion over a predetermined threshold point by the movement operation, and then the movement operation ends in front of the other end portion, the processor causes the notification unit to provide notification with the sound indicating that the predetermined processing is to be executed after the movement of the operation unit to the other end portion and the movement of the operation unit to the position corresponding to the other end portion, and in a case in which the movement operation ends without moving over the threshold point from the one end portion by the movement operation, the processor moves the operation unit to the one end portion, and causes the notification unit to provide notification with a sound indicating that the predetermined processing is not to be executed after the movement of the operation unit to a position in front of the one end portion.

\* \* \* \* \*